US006953634B2

United States Patent
Goedel et al.

(10) Patent No.: US 6,953,634 B2
(45) Date of Patent: Oct. 11, 2005

(54) METHOD FOR MANUFACTURING COMPOSITE MEMBRANES

(75) Inventors: Werner A. Goedel, Ulm (DE); Manfred Jaumann, Ulm (DE); Martin Moeller, Ulm (DE); Assiz Muzzafarow, Moskow (RU)

(73) Assignee: DaimlerChrysler AG, Stuttgart (DE)

( * ) Notice: Subject to any disclaimer, the term of this patent is extended or adjusted under 35 U.S.C. 154(b) by 56 days.

(21) Appl. No.: 10/371,451

(22) Filed: Feb. 20, 2003

(65) Prior Publication Data

US 2004/0062966 A1 Apr. 1, 2004

(30) Foreign Application Priority Data

Feb. 21, 2002 (DE) ......................................... 102 07 411

(51) Int. Cl.[7] .............................. H01M 8/10; C08J 5/22; C08G 77/04; C08L 83/04
(52) U.S. Cl. ........................... 429/33; 429/309; 429/30; 429/42; 521/27; 525/474
(58) Field of Search ........................... 429/33, 309, 30, 429/42; 521/27; 525/474

(56) References Cited

U.S. PATENT DOCUMENTS 5,438,082 A  8/1995 Helmer-Metzmann ...... 522/149
6,194,474 B1  2/2001 Kerres et al. ................. 521/27
2002/0127474 A1 * 9/2002 Fleischer et al. ........... 429/309
2003/0219640 A1 * 11/2003 Nam et al. ................... 429/33

FOREIGN PATENT DOCUMENTS

| DE | 4422158 | 1/1996 |
| DE | 19817374 | 10/1999 |
| DE | 19817376 | 10/1999 |
| EP | 0574791 | 12/1993 |

OTHER PUBLICATIONS

Hanselmann et al. "Macromolecules" vol. 31, No. 12, 1998 pp. 3790–3801.

* cited by examiner

Primary Examiner—Patrick Joseph Ryan
Assistant Examiner—Angela J. Martin
(74) Attorney, Agent, or Firm—Davidson, Davidson & Kappel, LLC

(57) ABSTRACT

A method for manufacturing composite membranes includes providing a branched polyalkoxy siloxane, providing an organic proton conductor, mixing the branched polyalkoxy siloxane with the organic proton conductor; and forming a membrane from the composite component mixture. Using the method according to the present invention, it is possible to increase the proton conductivity and the mechanical stability of membranes and to reduce the swelling by water and aqueous solutions. The obtained composite membranes may be used in PEM fuel cells.

6 Claims, 15 Drawing Sheets

$^{29}$Si NMR chemical shift [ppm] – TMS

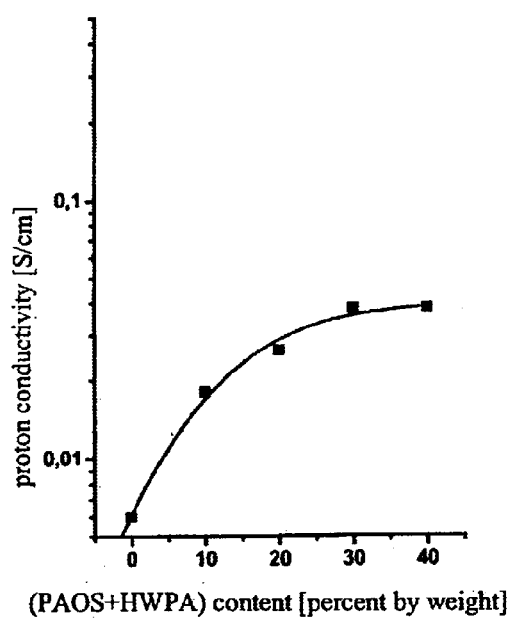
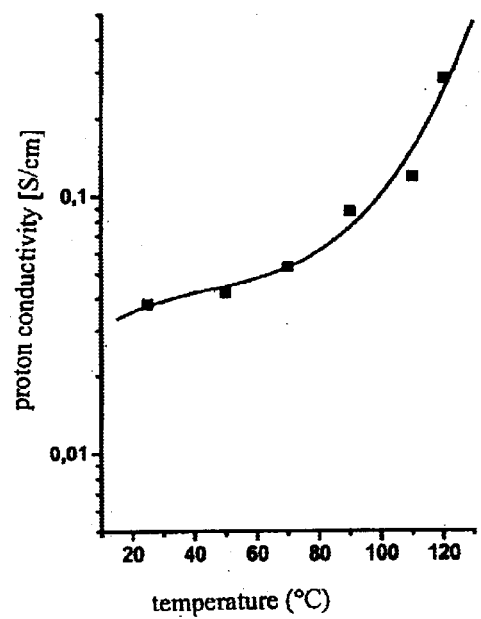
FIG. 15a
FIG. 15b

METHOD FOR MANUFACTURING COMPOSITE MEMBRANES

CROSS-REFERENCE TO RELATED APPLICATIONS

This application claims priority to German Patent Application DE 102 07 411.9, filed Feb. 21, 2002, which is incorporated by reference herein.

BACKGROUND

The present invention relates to a method for manufacturing composite membranes, the composite membranes manufactured according to this method, composite membranes containing at least one siliceous reinforcing material and at least one organic proton conductor, and to the use of these composite membranes in PEM fuel cells.

Membranes for PEM fuel cells must have sufficient chemical and mechanical stability, high proton conductivity, and they must be inexpensive to manufacture.

The perfluorinated cation-exchange membranes used till now show considerable deficiencies in this regard. Besides the complex manufacturing method and the recycling problem, this material is very expensive and has a high methanol permeability, which markedly limits the use of these membranes, for example, in direct methanol fuel cells (DMFC).

Further membrane materials are modified, high-temperature resistant polymers, such as polybenzimidazole (PBI) and polyethersulfone (PES). To this end, the PBI is usually treated with phosphoric acid. The phosphoric acid molecules are, on one hand, attached to the polymer by hydrogen bridge bonds and, on the other hand, bound in the membrane to protonate the imidazole group. However, it is problematic that the phosphoric acid is gradually separated from the PBI matrix with the water produced during the operation of the fuel cell. Moreover, the PBI phosphoric acid membrane has a very low E-module, which is why unsatisfactory stability of the membrane is to be expected in fuel cells.

Inexpensive alternative materials based on sulfonated aryl polymers as, for example, sulfonated PEEK, PEK and PES, are known from European Patent Application EP 0 574 791 A1. However, the cation-exchange membranes made from such sulfonated aryl polymers exhibit strong swelling properties at elevated temperature. Therefore, the suitability of such membranes for use in a fuel cell system is strongly limited.

German Patent Application 44 22 158 A1 describes composite membranes made of sulfonated polyetherketone (PEK) and unmodified polyethersulfone (PES). The two components are completely miscible with one another, which is attributable to their very similar chemical structures and to the polarity of PES (ion-dipole interactions). However, this interaction arising from similarity of structure appears to be still insufficient so that there is a risk for these membranes to swell strongly at elevated temperature when operating with an ion-exchange capacity as is required in the operation of fuel cells. Described are three or four component mixtures of sulfonated PEK, PES, polyvinyl pyrrolidone (PVP) und polyglycol dimethyl ether (PG) that have a better water absorption. However, no quantitative information is provided on water absorption.

German Patent Application DE 198 17 374 A1 describes mixtures of sulfonated aryl polymer (PEEK and PSU) and polybenzimidazole (PBI) which are covalently cross-linked due to the proton transfer from the sulfonated aryl polymer to the PBI (e.g., PEEK-$SO_2$—O—H—N-PBI). This cross-linking occurs already at room temperature in the solvent, for example, N-methyl pyrrolidone (NMP), forming an insoluble polyelectrolyte complex. In order to manufacture composite membranes, the sulfonated aryl polymer must be converted into a soluble salt form. This additional step complicates the manufacture of the membrane.

The interaction between PBI and aryl polymer is so strong that high inhomogeneities can be caused in the membrane between the cross-linking region, the water-swollen gel phase, and the polymer matrix. Consequently, internal stresses can develop in the membrane, which can deteriorate the mechanical stability of the membrane.

Also known in the prior art are composite membranes made of sulfonated aryl polymer (PEEK or PSU) with aminated polysulfone (PSU). Since aminated polysulfones are weak polybases, it is possible to produce polyacid-base mixtures in the solution. Both ionic interactions and hydrogen bridge bonds act between the composite components, i.e. ring structures that are physically crosslinked. These composite membranes were tested in PEM fuel cells and direct methanol fuel cells. In the process, current densities of 1.0 to 1.2 $A/cm^2$ developed in $H_2/O_2$ PEM fuel cells at a voltage of 0.7 V, and of 0.4 to 0.6 $A/cm^2$ in air/$H_2$ PEM fuel cells. In direct methanol fuel cells, this membrane showed an i-U curve comparable to that of, for example, Nafion 117.

SUMMARY OF THE INVENTION

An object of the present invention is to provide a method for manufacturing composite membranes which allows the manufacture of membranes with improved mechanical stability combined with improved proton conductivity.

Accordingly, a first subject matter of the present invention is a method for manufacturing composite membranes. The method includes the following steps:

a) providing a branched polyalkoxy siloxane;

b) providing an organic proton conductor;

c) mixing the branched polyalkoxy siloxane with the organic proton conductor;

d) manufacturing a membrane from the composite component mixture.

In the context of the present invention, "composite membrane" is understood to refer to membranes, which are essentially composed of mixtures of one or more organic polymers with one or more inorganic materials. In this context, the organic polymer has the function of a proton conductor, for example PEM (polymer electrolyte membrane), while the inorganic material is responsible, for example, for improving the mechanical properties, for example, by adding rigidity to the composite material, and by increasing the water-holding capacity of the membrane, even under desiccating conditions, or by contributing, as a proton donor or proton acceptor, to the proton conductivity of the organic proton conductor. However, it is also possible that the inorganic material has mainly the function of an electrolyte and that the organic polymer assumes the task of improving the mechanical properties, for example, by adding flexibility to the composite material. A further possibility for composite membranes are mixtures of one or more organic polymers with one or more organic reinforcing materials, such as PTFE or inorganic fibers, woven fabrics, nonwoven fabrics, or stretched, porous PTFE films. In the context of the present invention, preference is given to composite membranes made of mixtures of one or more organic polymers with one or more inorganic materials.

"Unbranched polyalkoxy siloxanes" are understood to mean polymeric alkoxy siloxanes, whose molecules essentially contain only double-bonded [$SiO_2(OR)_2$] middle units (where R=H, alkyl, alkenyl, aryl, heteroaryl) in the polymer chain and single-bonded [$SiO(OR)_3$] end units. The structures of these compounds are derived from those of the chain-like or branched polysilicic acids.

"Branched polyalkoxy siloxanes" are understood to mean polymeric alkoxy siloxanes which additionally have triple-bonded [$SiO_3(OR)$] branching units and quadruple-bonded [$SiO_4$] double-branching units. The structures of these compounds are also derived from those of the corresponding polysilicic acids, the OH residues being also essentially replaced with OR residues (R=alkyl).

"Highly branched polyalkoxy siloxanes" are understood to mean polymeric alkoxy siloxanes which have a very high proportion of triple-bonded [$SiO_3(OR)$] branching units and quadruple-bonded [$SiO_4$] double-branching units. In these compounds, at least one [$SiO_3(OR)$] branching unit and/or [$SiO_4$] double-branching unit is/are is located essentially at every $n^{th}$ [$SiO_2(OR)_2$] middle unit of the polymer chain, with n being in the range 1 to 10, preferably 1 to 7, and, in particular, 1 to 4. The structures of these compounds are derived from those of the amorphous polysilicic acids. In the context of the present invention, particular preference is given to the use of highly branched polyalkoxy siloxanes.

The branching degree of polyalkoxy siloxanes can be calculated according to Frey from the $^{29}$Si NMR (H. Frey et al., Acta Polym. 1997, 48, 30; H. Frey et al., Macromolecules 1998, 31, 3790).

Completely linear polymers, for example, completely unbranched polyalkoxy siloxanes, have a branching degree of 0%, perfect dendrimers have a branching degree of 100%. In the context of the present invention, "branched polyalkoxy siloxanes" are understood to mean polymers having a branching degree of less than 50%, and "highly branched polyalkoxy siloxanes" are understood to mean polymers having a branching degree of 50% and more.

"Composite component mixture" is understood to mean the mixture of the components for the manufacture of a composite membrane. In the present case, this is a mixture containing at least one branched polyalkoxy siloxane and one organic proton conductor.

Polyalkoxy siloxanes that are suitable according to the present invention have a branching degree of 30% or more, preferably of 45% or more, and, in particular, of 60% or more.

With increasing degree of branching, polyalkoxy siloxanes have the advantage that they are better soluble in organic solvents than unbranched polyalkoxy siloxanes. On one hand, therefore, the polyalkoxy siloxanes can be dissolved in an organic solvent in a wide range of concentrations. On the other hand, this allows the polyalkoxy siloxanes to be mixed with an organic proton conductor in an easy and homogenous manner.

It is assumed that the branched, in particular, the highly branched polyalkoxy siloxanes form ion channels in the composite membrane, which have a particularly irregular, i.e. fissured surface.

Therefore, the surface of the ion channels increases with increasing branching degree of the polyalkoxy siloxanes used and, thus, retains water molecules better, which has a positive effect on the proton conductivity of the composite membrane.

The composite components contain at least one polyalkoxy siloxane (PAOS) and at least one organic proton conductor.

In a preferred embodiment of the present invention, organic polymers that are suitable for use as electrolytes in PEM fuel cells are used as an organic proton conductor. These include, for example, aryl polymers such as polyetherketones (PEK), polyetheretherketones (PEEK), polysulfones (PSU), polybenzimidazoles (PBI), polyethersulfones (PES), Polyetherethersulfones (PEES), as well as polyvinyl pyrrolidones (PVP) und polyglycol dialkyl ether (PG). Furthermore, these also include the sulfonated or aminated species of the aforementioned polymers, for example, sulfonated polyetheretherketones (SPEEK) as well as sulfonated polytetrafluoroethylene, such as Nafion. Mixtures of the aforementioned polymers are also suitable. In the context of the present invention, particular preference is given to sulfonated polyetheretherketones (SPEEK).

Using the method according to the present invention, it is possible to markedly increase the proton conductivity and the mechanical stability of membranes by adding polyalkoxy siloxane (PAOS) during the manufacture of membranes of polymer proton conductors and to reduce the swelling by water and aqueous solutions.

A further advantage is that the property profile of the composite membranes can be specifically adapted to the requirements for use in fuel cells by varying the mixing ratio between polyalkoxy siloxane and organic proton conductor.

Another advantage of the method according to the present invention is the possibility to selectively manufacture special polyalkoxy siloxanes. Thus, in the method according to the present invention, the polyalkoxy siloxane precursors, correspondingly alkoxy-substituted silanols, can be condensed in a controlled manner in an organic solvent to form the desired polyalkoxy siloxane and mixed with the organic proton conductor only after that. Contrary to this, in prior art methods, the polyalkoxy siloxane precursors are first mixed with an organic proton conductor and only then caused to undergo condensation, which allows only poor control of the condensation reaction.

The condensation reaction is represented, by way of example, in the following scheme:

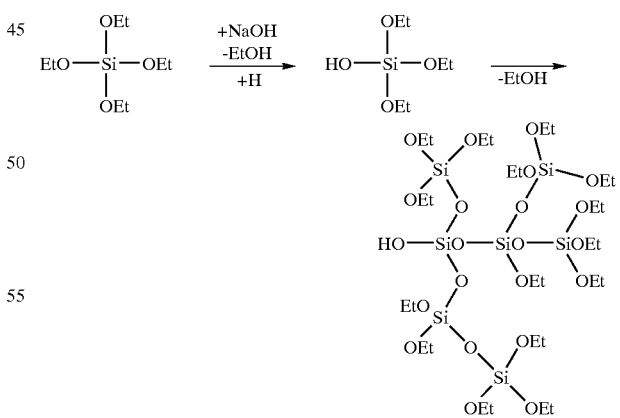

In an advantageous variant of the present invention, the method includes the following steps:
 a) dissolving a branched polyalkoxy siloxane in a solvent;
 b) dissolving an organic proton conductor in a solvent;
 c) mixing the solution of the branched polyalkoxy siloxane with the solution of the organic proton conductor;

d) manufacturing a membrane from the composite component mixture.

In this context, it is advantageous to use the same solvent for the dissolution of all composite components.

By varying the ratio of the solutions of the composite components, it is possible to obtain membranes of different composition.

The membrane can be manufactured by casting, knife-coating, or by spreading the composite components, in particular, solutions of the composite components, on the wall of a rotating centrifuge cup and subsequently evaporating the solvent.

In a further preferred variant of the present invention, heteropoly acids are added to the composite membrane. Then, the heteropoly acids are a further component of the composite component mixture. They can either be added to a common solution of the composite components prior to manufacturing the membrane, or the addition takes place after the manufacture of the membrane by subsequent conditioning of the already produced membranes with a solution of the heteropoly acids. Addition of aqueous heteropoly acids can contribute to the hydrolysis of the polyalkoxy siloxanes.

For example, phosphotungstic acid hydrate (HPWA) has proven to be suitable as a heteropoly acid. "Phosphotungstic acid" is understood to be phosphotungstic acid hydrate having the formula $H_3[P(W_3O_{10})_4] \cdot xH_2O$ (e.g., Merck company).

A second subject matter of the present invention is a composite membrane which is obtainable according to the method of the present invention.

An essential advantage of composite membranes is that the membrane structure or the membrane properties can be selectively optimized by varying the composite components and the mixing ratio.

The polyalkoxy siloxanes form structurally rigid, finely dispersed, porous Si-oxides having zeolite-like structures in the membrane. This is a further advantage of the composite membranes according to the present invention. In fact, these zeolite-like structures are able to strongly bind certain amounts of water and, thus, to regulate the hydration state of the organic proton conductor.

A third subject matter of the present invention is a composite membrane containing at least one siliceous reinforcing material and at least one organic proton conductor, the siliceous reinforcing material existing, at least partially, in the form of finely dispersed, spherical particles.

With regard to the alkoxy groups of the polyalkoxy siloxanes, it should be considered that these groups are easily hydrolyzable and that they can therefore be cleaved by water, which is present, in the course of manufacture of the membrane so that, strictly speaking, at least partially hydrolyzed polyalkoxy siloxanes are already present during the manufacture of the composite membranes. It is also possible to for the polyalkoxy siloxanes to be hydrolyzed during the aftertreatment of the membranes or/and upon addition of aqueous heteropoly acid. At the latest when the polyalkoxy siloxane-containing composite membrane is used as a PEM in a fuel cell, virtually all alkoxy groups are cleaved. The siliceous material mentioned above is formed by the hydrolysis of the polyalkoxy siloxanes.

In a preferred embodiment of the present invention, the spherical siliceous particles have a particle size of 5 μm or less.

A fourth subject matter of the present invention is the use of the above-described composite membranes in PEM fuel cells.

BRIEF DESCRIPTION OF THE DRAWINGS

In the following, the present invention will be explained in greater detail in the light of exemplary embodiments with reference to the drawings, in which:

FIG. 15a shows proton conductivities at room temperature of composite membranes with different proportions of PAOS+HWPA in the membrane; and FIG. 15b shows the proton conductivity of a composite membrane containing 30 percent by weight of PAOS/HWPA as a function of temperature (the HWPA/PAOS ratio is 48/52 percent by weight).

DETAILED DESCRIPTION

EXAMPLE

Figure 1:
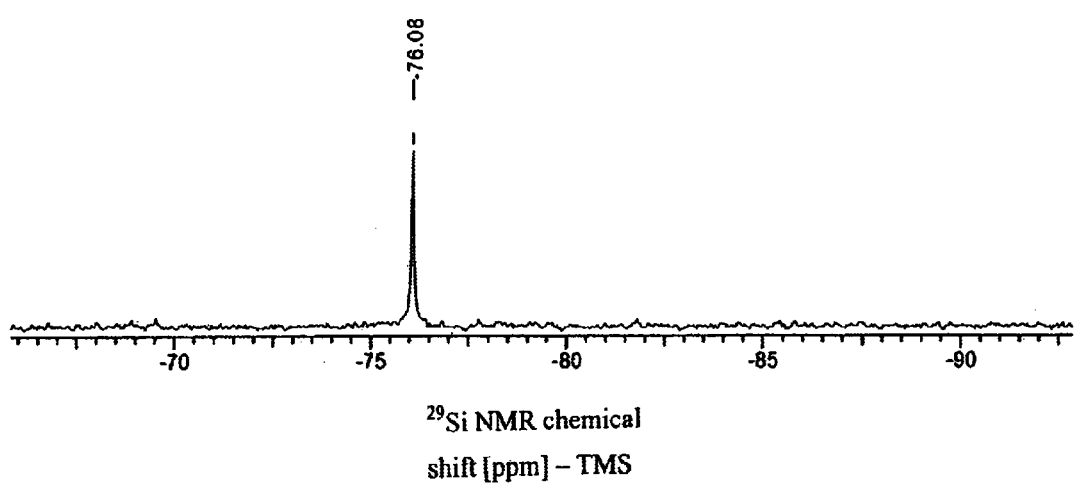
FIG. 1 shows the $^{29}Si$ NMR spectrum of sodium triethoxy silanolate dissolved in a toluene/toluene d8 mixture (volume ratio 1/1). The peak at 76.1 ppm corresponds to the Si atom in the sodium triethoxy silanolate molecules.

The manufacture of an inventive composite membrane described below consists of 3 steps:

1. Synthesis of a highly branched polyalkoxy siloxane
2. Synthesis of a sulfonated polyetheretherketone (SPEEK)
3. Manufacture of a membrane Step 1: Synthesis of a Highly Branched Polyalkoxy Siloxane The starting materials were prepared for use in the synthesis of the polyalkoxy siloxane as follows.

Sodium hydroxide (Merck, pa) was ground under an atmosphere of dry argon using a hammer mill (Framo Gerätetechnik, Eisenach, Germany). Argon 4.6 (MIT, Elchingen, Germany) was dried over a 5×50 cm column filled with phosphorous pentoxide. Ammonia 3.8 (Messer-Griesheim, Krefeld, Germany) was dried over sodium hydroxide pellets. Tetraethoxysilane (Merck), ethanol (Seccosolv TM, Merck), and acetic acid (purum, >99%, Fluka) were used without further purification. Toluene (technical purity) was dried over lithium aluminum hydride (Merck) and distilled under argon atmosphere. Molecular masses and molecular mass distributions of PAOS were obtained by size exclusion chromatography, SEC, (gel permeation chromatography, GPC) using tetrahydrofuran (THF, pa, Merck) as a solvent. The setup consists of Waters µ-Styragel columns having nominal pore sizes of $10^6$, $10^5$, $10^4$, $10^3$ and 500 Å as well as a protection column. Sample detection was performed using a Waters 410 differential refractometer and a Viscotek H502B differential viscometer connected in parallel, which allow the determination of absolute molecular weights as well as a universal calibration. All filtrations were carried out using an inert gas frit (pore size n°4).

1.1) Synthesis of Sodium Oxytriethoxysilane 40 g (1 mol) of pulverized sodium hydroxide was added under agitation to a solution of 208 g (1 mol) tetraethoxysilane in 500 ml of toluene at 5° C. After 2 hours of agitation, the toluene and the ethanol, which formed during the reaction, were distilled off using a rotary evaporator with a diaphragm pump. The oily residue was dried overnight in a vacuum chamber at 50 mbar/40° C. (yield: 182 g). 92 g of this solid was dissolved in 270 ml toluene and the insoluble by-product was removed by filtration.

1.2.) Synthesis of Triethoxy Silanol

The sodium oxy triethoxy silanolate solution obtained according to the above reaction was filled with toluene to a total volume of 500 ml. Then, this solution was added dropwise to a solution of a stoichiometric amount of acetic acid in 300 ml under agitation at 0° C. After filtering off the precipitated sodium acetate and washing with toluene, the toluene solution was concentrated at 8 mbar/30° C. until dryness. 38,3 g of a yellow liquid was obtained as a residue.

1.3.) Synthesis of Polyethoxy Siloxane

Polyethoxy siloxane was synthesized by adding the obtained triethoxy silanol to a solution of 6.5 g ammonia in 100 ml ethanol at −30° C. over a period of 1 h. After heating to room temperature and allowing to stand overnight, the ethanol and the remaining ammonia were distilled off, leaving 30.3 g of a yellow liquid. Drying this residue under oil-pump vacuum yielded 29.7 g of polyethoxy siloxane.

1.4.) Characterization of Products

Sodium oxy triethoxy silanolate: The sodium oxy triethoxy silanolate was analyzed using $^{29}$Si NMR (FIG. 1). The spectrum consists of a single peak at −76.1 ppm, which indicates that the synthesized compound is 99% pure.

Figure 2:
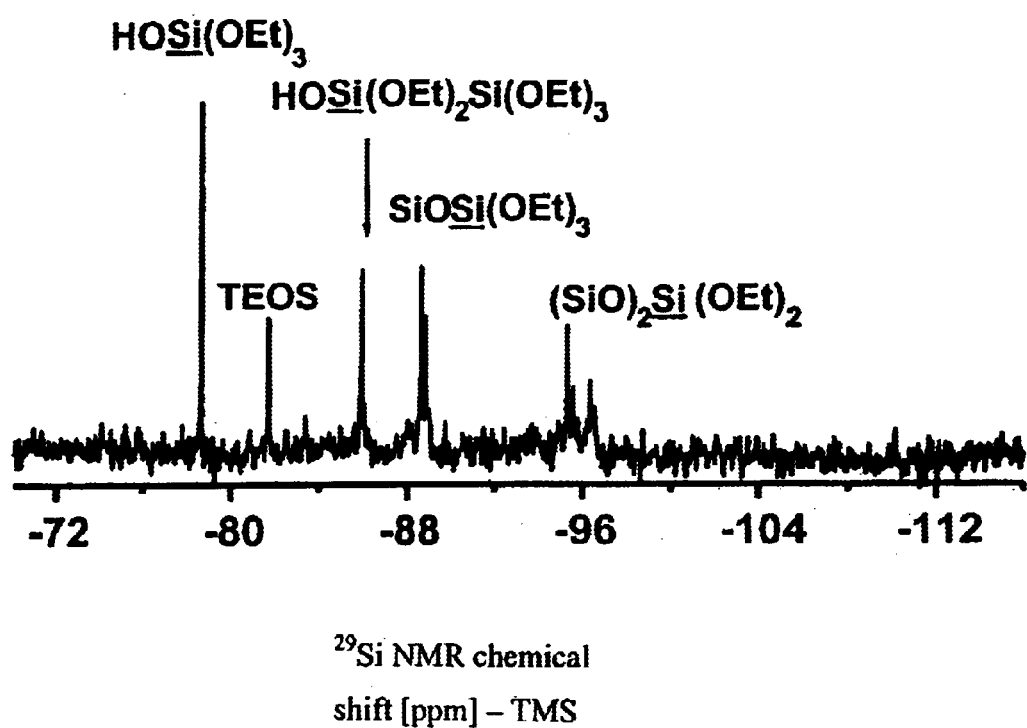
FIG. 2 shows the $^{29}Si$ NMR spectrum recorded at −30° C. of triethoxy silanol and oligomeric species, which were formed at −70° C.

Triethoxy silanol: The "triethoxy silanol" obtained according to the above method begins to condense already without ammonia as a catalyst. A $^{29}$Si NMR spectrum (FIG. 2) recorded shortly after neutralization at −75° C. shows that triethoxy silanol (peak at −78.6 ppm) and forming condensed species (signals at −85.9 ppm, −88.7 ppm and −95.3 ppm) are present side-by-side. After prolonged storage at room temperature, the material is predominantly composed of oligomeric species.

Polyethoxy Siloxane:

Molecular structure: The obtained polyethoxy siloxane was characterized by $^{29}$Si NMR. The $^{29}$Si NMR spectrum (FIG. 3) shows five peaks which are attributable to Si atoms having (from left to right) four, three, two, one or zero ethoxy groups, or zero, one, two, three and four siloxane substituents, but no hydroxy groups. The appearance of tetraethoxysilane (peak at −81 ppm) and shoulders on the left side of the main peak indicates that the formation of rigid rings occurs as a side reaction competing with the polycondensation of the triethoxy silanol.

Figure 3:
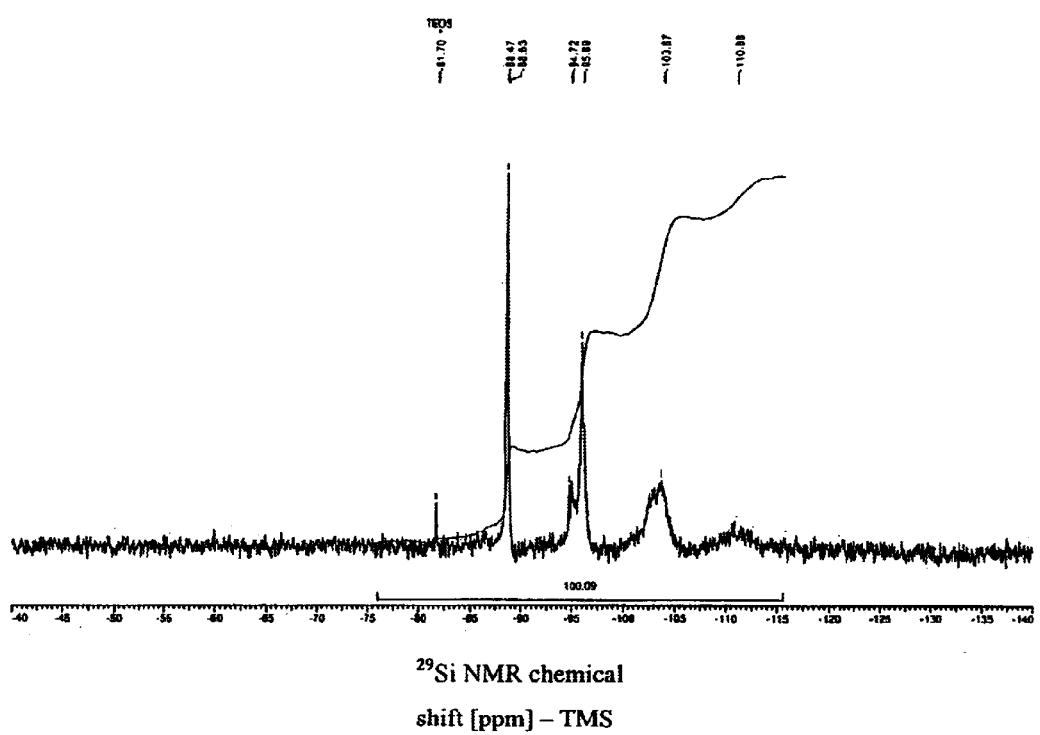
FIG. 3 depicts the $^{29}Si$ NMR spectrum of polyethoxy siloxane dissolved in toluene-d8. It has five peaks which are attributable to Si atoms (from left to right) which carry four, three, two, one and zero ethoxy groups, or zero, one, two, three and four siloxane substituents, but no hydroxy groups.

Degree of branching: In FIG. 3, five different peak groups can be distinguished which, from left to right, are attributable to silicon atoms which carry 4, 3, 2, 1 and 0 ethoxy groups and, also from left to right, are linked to 0, 1, 2, 3 and 4 further silicon atoms via oxygen bridges. In the following, these silicon atoms will be indicated by the abbreviation $Q^i$, with i being the number of neighboring atoms silicon atoms linked via oxygen atoms. Analogously to Frey's definition of the branching degree in polymers (H. Frey et al., Acta Polym. 1997, 48, 30; H. Frey et al., Macromolecules 1998, 31, 3790) that are synthesized from $AB_3$ monomers, the branching degree in polydiethoxy siloxane can be defined according to equation 1:

$$DB = \frac{2Q^4 + Q^3}{\frac{2}{3}(3Q^4 + 2Q^3 + Q^2)} \qquad \text{Equation 1}$$

Using the integrated peak areas of the $^{29}$Si NMR spectrum in FIG. 3, a branching degree of the inventive polydiethoxy siloxane of 61.2% is yielded.

Figure 4A:
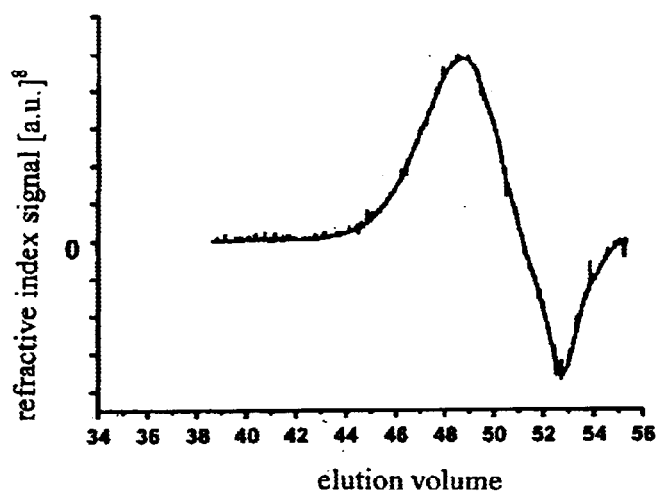
FIG. 4a shows the refractive index signal of a polymer which is eluted with THF from the SEC.
Figure 4B:
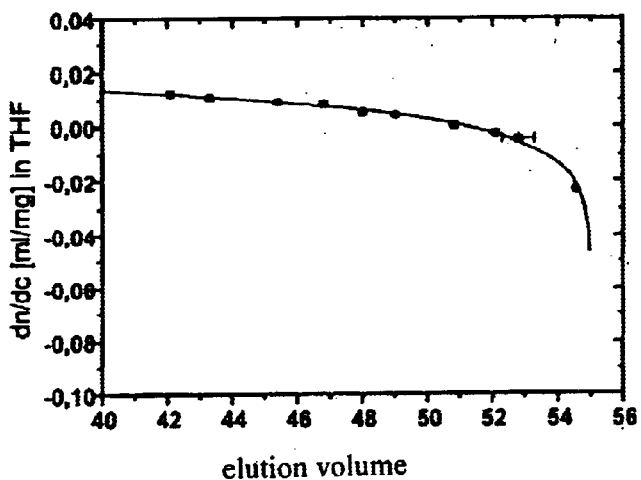
FIG. 4b shows the change of the refractive index with the elution volume for the calculation of the weight fractions of the polymer from the refractive index signal.
Figure 4C:
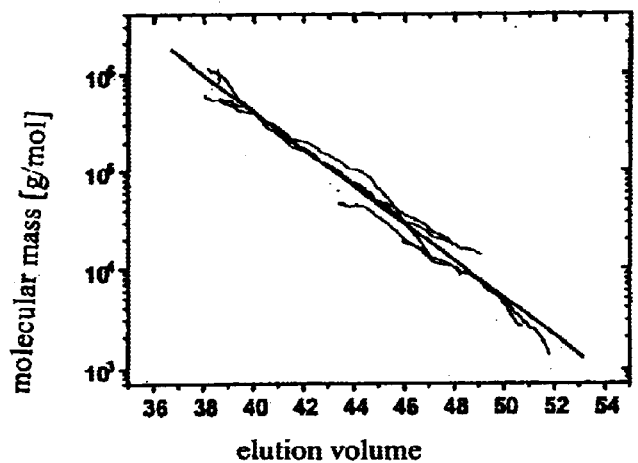
FIG. 4c depicts the universal calibration curve of the SEC system, which is derived from viscometric measurements of the fractionated polyethoxy siloxane, for the calculation of the molecular masses from the elution volume.
Figure 5:
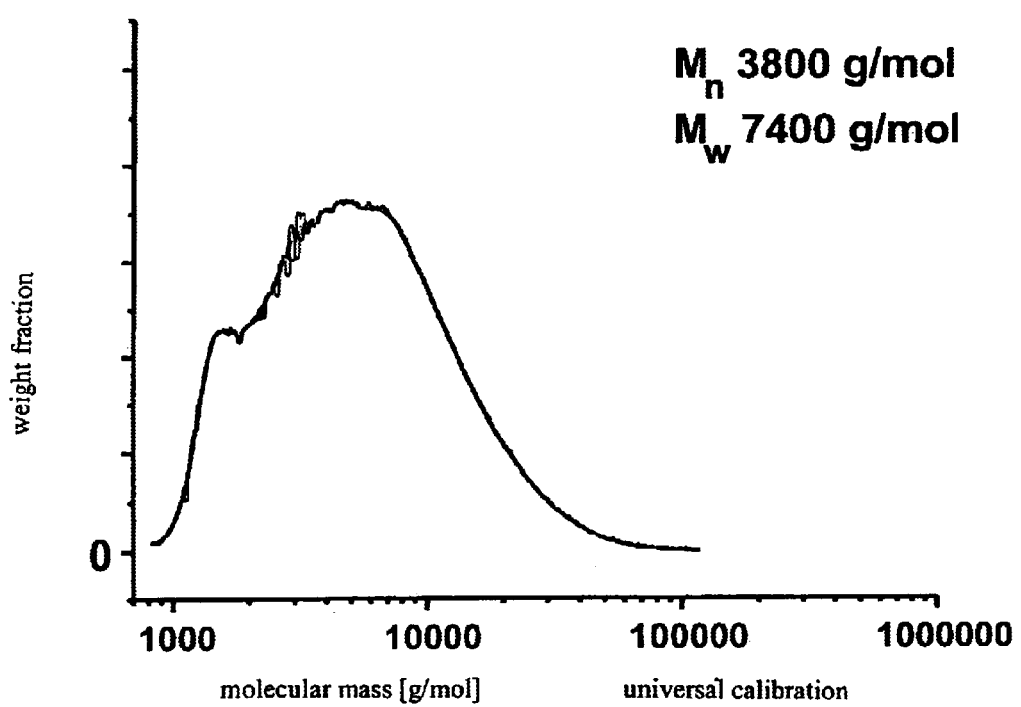
FIG. 5 shows the molecular mass distribution of polyethoxy siloxane, calculated from the refractive index signals of the eluted polymer (FIG. 4a), an experimentally determined function of the change of the dn/dc with the elution volume (FIG. 4b) and the universal calibration curve (FIG. 4c)

Molecular mass distribution: The molecular mass distribution of the polymer from FIG. 5 was obtained by size exclusion chromatography, SEC, (gel permeation chromatography, GPC) in THF. The weight fractions of the polymer were calculated with baseline and flow correction of the refractive index signal (FIG. 4a), which where then divided by an experimentally determined dn/dc function (FIG. 4b). The universal calibration curve was then used for calculating the molecular masses (FIG. 4c). According to these calculations, the polymer has an average molecular mass of 3.8 kg/mol and a weighted average molecular mass of 7.4 kg/mol.

Step 2: Synthesis of Sulfonated Polyetheretherketone (PEEK)

Synthesis: In a three-neck reaction vessel, 20 g PEEK (Victrex, 450PF: general-purpose fine powder for coating and compression molding) was dissolved in 1 liter of sulfuric acid (95 to 98 wt-%) at room temperature. Then, the reaction solution was stirred for 24 to 120 h (see Table 1) and subsequently added dropwise to water. The sulfonated PEEK was precipitated. The sulfonated PEEK was repeatedly washed with water until the washing water had a pH value between 6 and 7. After that, the product was dried under oil-pump vacuum for 10 to 24 h at 100° C.

Characterization: The polymers obtained above were characterized using elemental analysis, titration, infrared spectroscopy, thermogravimetric analysis, and impedance spectroscopy. The properties obtained by elemental analysis and titration as well as the swelling and the proton conductivity are summarized in Table 1. In order to determine the ion-exchange capacity, a titration was performed with 0.1 normal sodium hydroxide solution.

Based on the provisions of the standard for analyzing the swelling of plastics (DIN 53495), the membrane swelling was determined as follows:

A membrane sample having a mass of 0.5 to 6 g was put into water. Subsequently, the sample and the water were brought to the test temperature. After the test duration (48 to 72 h) had elapsed, the sample and the water were cooled to room temperature. Subsequently, the membrane sample was removed, superficially dried with cellulose tissues and the weight of the swollen membrane $W_{sw}$ was determined. The period between the removal and the measurement was kept as short as possible. After that, the membrane sample was dried in the drying oven until constant weight and the dry weight $W_{dry}$ was determined. The swelling of the membrane was then calculated according to the following equation:

$$\text{swelling } (\%) = 100 \, (W_{sw} - W_{dry})/W_{dry}$$

706.8 cm$^{-1}$ are attributable to the oscillations of the SO$_3$H group. The absorption band at 1019 cm$^{-1}$ is attributable to the asymmetric stretch of O=S=O, the symmetric stretch of the O=S=O unit lies at 1079 cm$^{-1}$, the stretch of S=O lies at 1249 cm$^{-1}$, and the stretch of S—O lies at 706.8 cm$^{-1}$.

Figure 7:
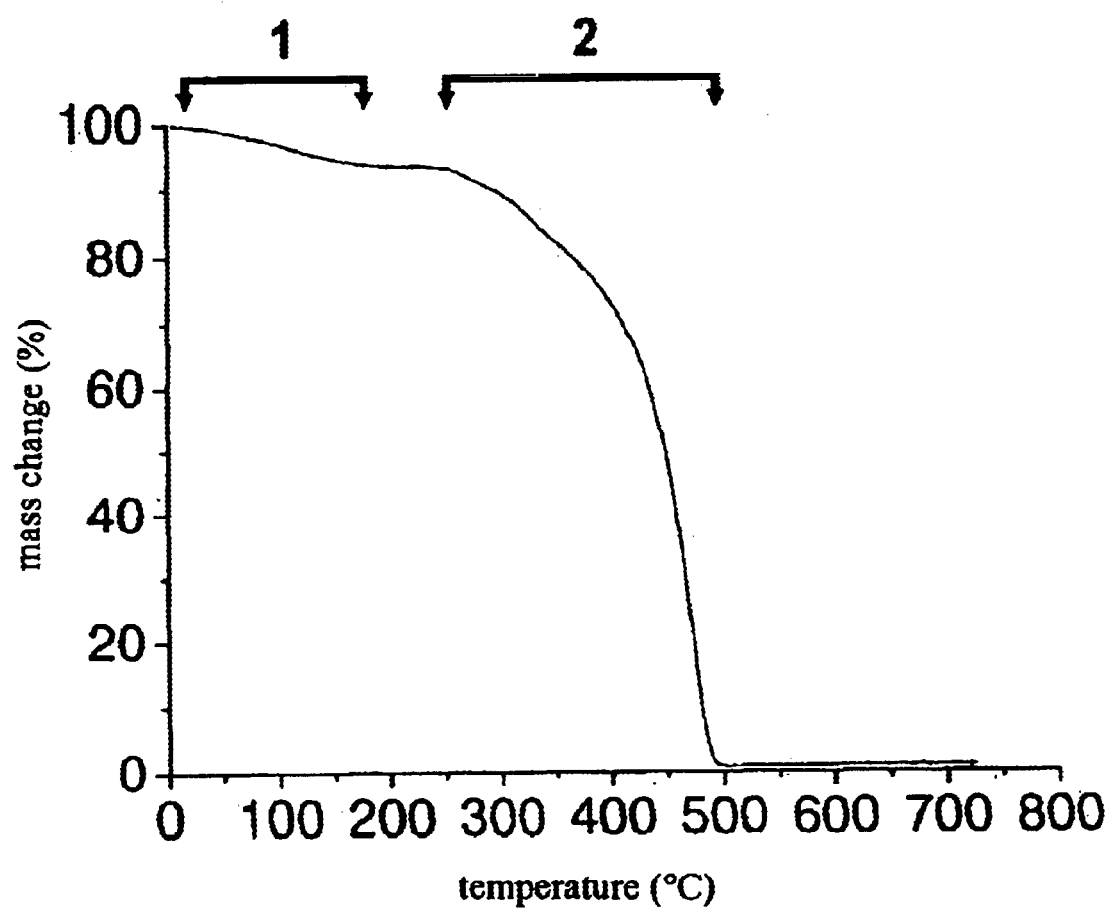
FIG. 7 shows the TGA diagram of SPEEK-1 measured in an oxygen atmosphere with a heating rate of 2 K/min. Mass loss (1), which occurs up to 170° C., is attributable to the release of water that is bound in the membrane. Mass loss (2), which occurs starting at 250° C., has to be attributed to the decomposition of the membrane material.

A further test method is the thermogravimetric analysis (TGA) of the polymers in an oxygen atmosphere. In FIG. 7, a TGA diagram of SPEEK-1 is shown by way of example. Mass loss (1), which occurs up to 170° C., is attributable to the release of water that is bound in the membrane. Mass loss (2), which occurs starting at 250° C., has to be attributed to the decomposition of the membrane material. The unfilled membrane can be decomposed in the oxygen stream without producing residues.

Step 3: Manufacture of the Composite Membranes

Synthesis: The composite membranes were manufactured by mixing solutions of the individual components in a common solvent and subsequently casting, knife-coating, or spreading the solvent on the wall of a rotating centrifuge cup, following by the evaporation of the solvent. Heteropoly acids were either added to the common solution prior to manufacturing the membrane or introduced into the membranes by subsequent conditioning of already produced membranes with a solution of the heteropoly acids. The components of the composite membranes included sulfonated polyetheretherketone polymer (SPEEK), polyalkoxy siloxane (PAOS), and phosphotungstic acid hydrate (HPWA, puriss., Fluka). By way of example, syntheses with N-methyl pyrrolidone (NMP) as the common solvent will be described. Alternatively, it is also possible to use mixtures of NMP with low alcohols.

The N-methyl pyrrolidone was dried using a molecular sieve prior to use. In the process, the N-methyl pyrrolidone was conducted through a column filled with molecular sieve and subsequently kept over molecular sieve for 72 h. After Karl-Fischer titration, the obtained NMP contained less than 0.02 percent by weight of water.

After preparing a 5 percent by weight solution of SPEEK in this NMP dried in this manner as well as a 1.65 percent by weight solution of PAOS in NMP, these solutions were

TABLE 1

Selected properties of a number of sulfonated PEEK polymers

| ID | reaction time [h] | ion-exchange capacity [meq/g] | SO$_3^-$ groups per repeating unit based on titration | elemental analysis C/H/S found (calculation is based on titration [percent on weight] | SO$_3^-$ groupd per repeating unit based on S- and C-elemental analysis | swelling (%) at 80° C./95° C. | proton conductivity S/cm |
|---|---|---|---|---|---|---|---|
| SPEEK 1 | 120 | 2.05 | 0.71 | 61.0/4.0/5.6 (66.1/3.5/6.6) | 0.65 | resolution | 3.32·10$^{-2}$ |
| SPEEK 2 | 120 | 2.1 | 0.73 | n.d. | — | — | — |
| SPEEK 3 | 115 | 1.99 | 0.68 | n.d. | — | — | — |
| SPEEK 4 | 70 | 1.62 | 0.54 | 68.0/3.8/5.0 (68.8/3.6/5.3) | 0.52 | 98/resolution | 7.15·10$^{-3}$ |
| SPEEK 5 | 70 | 1.65 | 0.55 | 67.0/4.1/5.0 (68.7/3.6/5.3) | 0.53 | 130/resolution | 1.18·10$^{-2}$ |
| SPEEK 6 | 95 | 1.8 | 0.61 | n.d. | — | — | — |
| SPEEK 7 | 40 | 1.35 | 0.44 | 67.5/4.0/4.1 (70.5/3.7/4.4) | 0.43 | 40/184 | 5.57·10$^{-3}$ |

Figure 6:
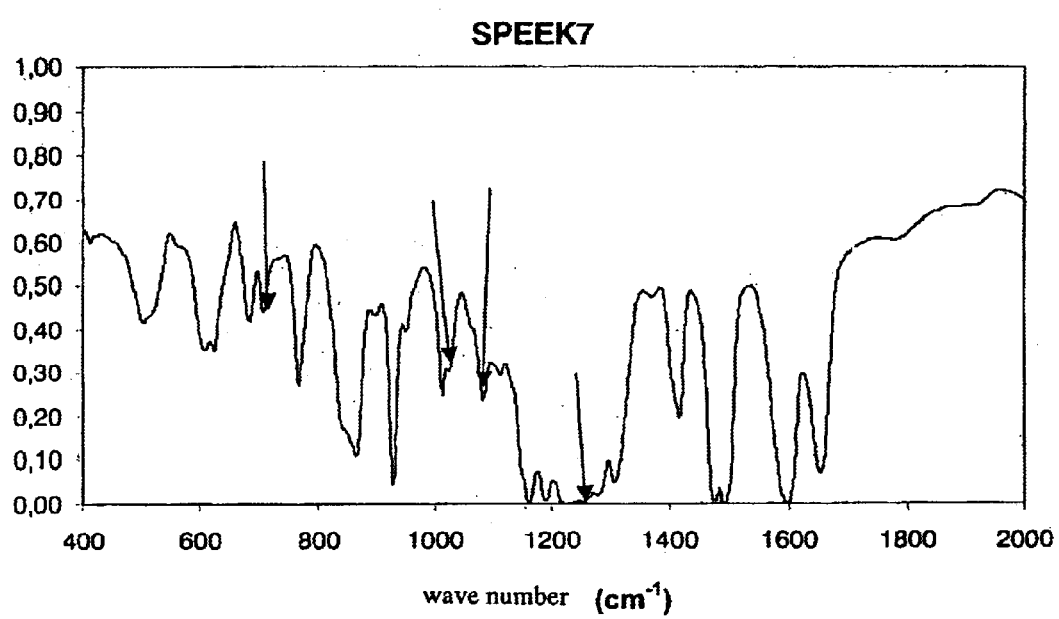
FIG. 6 depicts the FTIR spectrum of SPEEK-7. The arrows mark the absorption bands at 1249 cm$^{-1}$, 1079 cm$^{-1}$, 1019 cm$^{-1}$ und 706.8 cm$^{-1}$. These are attributable to the oscillations of the $SO_3H$ group. The absorption band at 1019 cm$^{-1}$ is attributed to the asymmetric stretch of O═S═O, the symmetric stretch of the O═S═O unit lies at 1079 cm$^{-1}$, the stretch of S═O lies at 1249 cm$^{-1}$, and the stretch of S—O lies at 706.8 cm$^{-1}$.

Besides the analysis by elemental analysis and titration, the structure of the sulfonated PEEK polymers was also determined using infrared spectroscopy. In FIG. 6, the FTIR spectrum of SPEEK-7 is shown by way of example. The absorption bands at 1249 cm$^{-1}$, 1079 cm$^{-1}$, 1019 cm$^{-1}$ and mixed by adding the PAOS solution to the SPEEK solution. By varying the ratio of the two solutions, it was possible to obtain membranes of different composition. In order to manufacture a membrane with phosphotungstic acid as a further component, an alcoholic solution of PAOS and phosphotungstic acid (9 percent by weight; mass ratio PAOS/HWPA: 69/31, unless otherwise specified) is added to the solution of SPEEK in NMP. This solution was added to the solution of SPEEK in NMP. In a departure from this method, the phosphotungstic acid can also be introduced into the membranes by subsequent conditioning of already produced PAOS/SPEEK membranes with a 10 percent by weight solution of phosphotungstic acid.

The actual manufacture of the membranes was carried out by casting, knife-coating, or centrifugation of the solutions described above. In the following, the membrane manufacture by casting and centrifugation will be described by way of example.

In order to obtain membranes by casting, the above prepared solution was poured into a glass dish, forming a thin film. Alternatively, it is also possible to spread a film on a flat support using a doctor blade. Thereupon, the solvent contained in the film was evaporated with the aid of a heating plate at 120 to 130° C. for a period of 25 to 40 min. If the solution also contained phosphotungstic acid, then the film was initially dried for 15 min at 90° C. and then at 120 to 130° C. for 20 to 30 min, in a departure from the above method.

Figure 8:
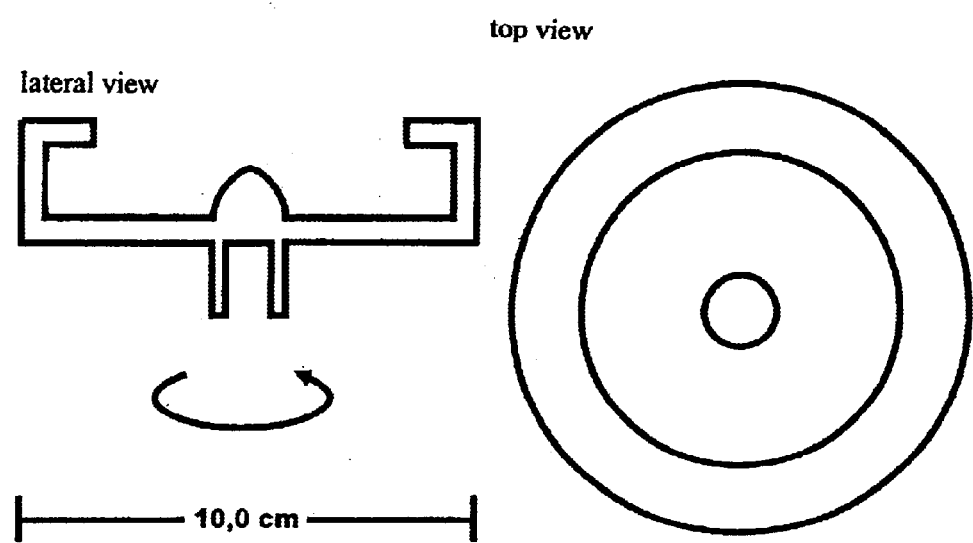
FIG. 8 is a sketch of the centrifuge cup used for forming the membrane using a centrifuge. The membrane is formed by dropping the solution onto the rounded elevation in the center of the insert, while the centrifuge rotates at high speed. In this manner, the solution is conveyed to the wall of the cup.

In order to manufacture the composite membranes using a centrifuge, the solution of the components was injected into a rotating centrifuge cup (rotational speed 15000/min; diameter 10 cm; height 3 cm; see FIG. 8) with an injection syringe. Upon dropping the solution onto the rounded elevation in the center of the insert while the centrifuge rotated at high speed, the solution was conveyed to the wall of the cup where it formed a uniform film after a few minutes. The solvent was evaporated using a hot-air blower for a period of 40 min. The dry film was removed from the wall of the cup.

Characterization of the composite membranes: The characterization was carried out using scanning electron microscopy, transmission electron microscopy, conductivity measurements, swelling measurements, and thermogravimetric analyses.

Figure 9:
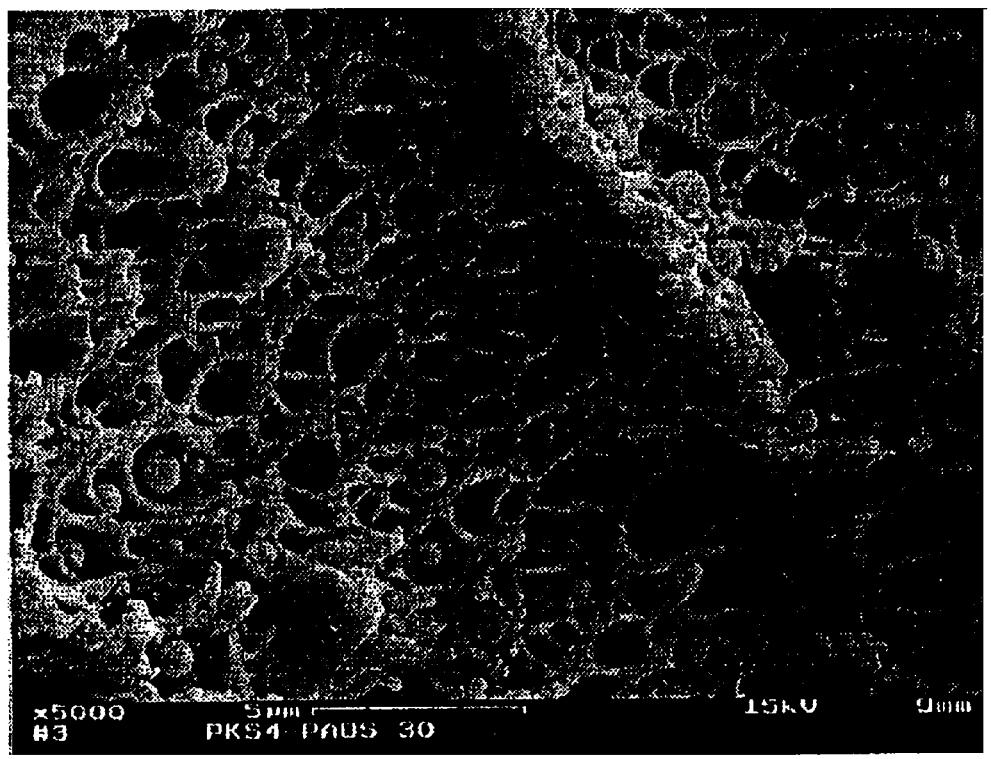
FIG. 9 is a scanning electron microscopic picture of a membrane made by centrifugation with 30 percent by weight of PAOS in SPEEK, without phosphotungstic acid.
Figure 10:
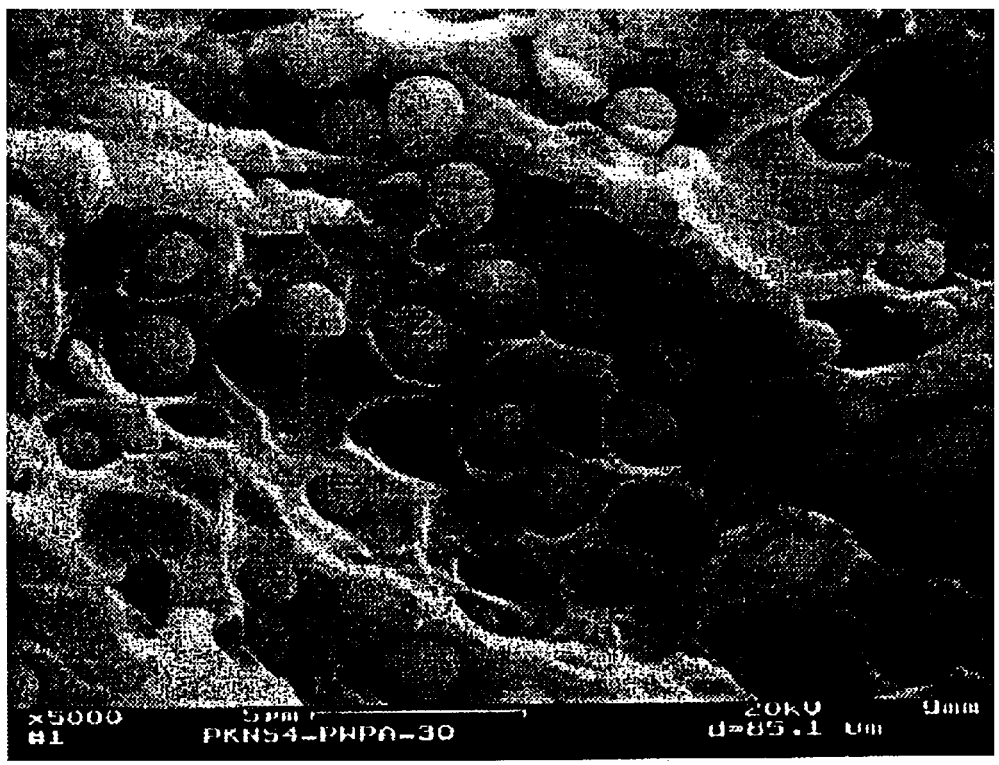
FIG. 10 shows a scanning electron microscopic picture of a membrane made by casting a phosphotungstic acid-containing SPEEK/PAOS solution which contains 30 percent by weight of HPWA/PAOS in SPEEK.
Figure 11:
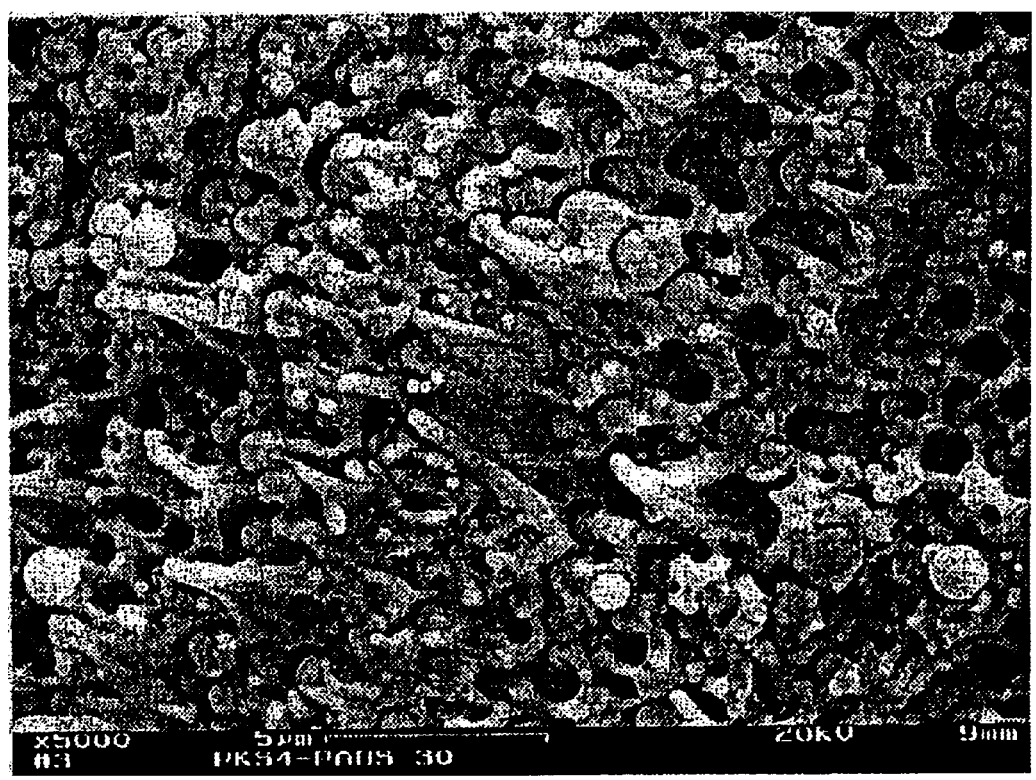
FIG. 11 is a scanning electron microscopic picture of a membrane made by casting which contains 30 percent by weight of HPWA/PAOS in SPEEK, the contained phosphotungstic acid being introduced into the membrane by subsequent conditioning.

Scanning electron microscopy (SEM): FIGS. 9 through 11 show, by way of example, scanning electron microscopic pictures of membranes having a PAOS-to-SPEEK ratio of 30/70 percent by weight.

FIG. 9 is the scanning electron microscopic picture of a membrane made using a centrifuge, which does not contain phosphotungstic acid.

FIG. 10 is the SEM picture of a membrane, which was separated by casting from a phosphotungstic acid-containing SPEEK/PAOS solution.

FIG. 11 shows the picture of a membrane, which, unlike the membrane in FIG. 10, was made by subsequent conditioning with phosphotungstic acid.

In all three Figures, a continuous phase can be seen in which are embedded the spherical objects having diameters between 0.5 and 3 $\mu$m. However, apart from a variation in size of the particles, no general differences in shape and structure of the particles can be seen that could be attributed to the different composition and method of manufacture.

Figure 12A:
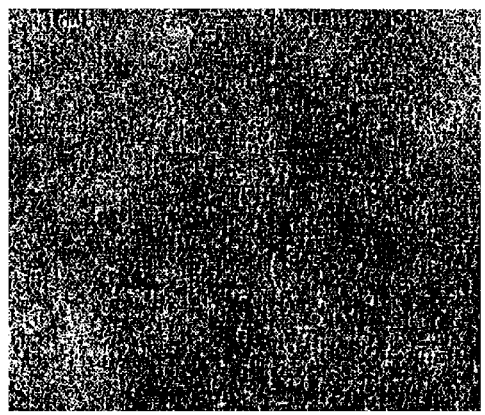
FIGS. 12a and 12b show transmission electron microscopic pictures of a membrane made by casting a phosphotungstic acid-containing SPEEK/PAOS solution.
Figure 12B:
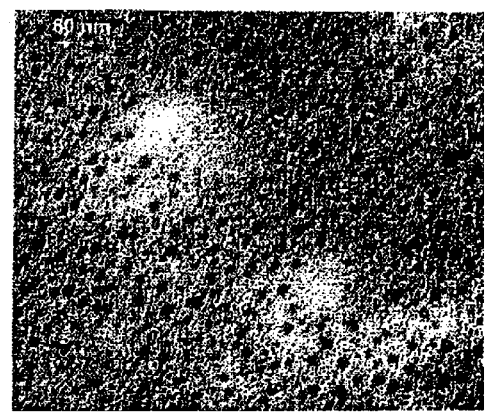

Transmission electron microscopy (TEM): Transmission electron microscopy has a higher resolution than scanning electron microscopy, making it possible to image structures which could not be observed using scanning electron microscopy. FIGS. 12a and 12b show, by way of example, transmission electron microscopic pictures of the "continuous phase" of a membrane made by casting a phosphotungstic acid-containing SPEEK/PAOS solution (PAOS/SPEEK 30/70 percent by weight). It can be seen that the matrix, which, in the SEM, appears to be continuous is also composed of a phase-separated material having structures of approximately 10 nm. According to the combination of SEM and TEM, the inorganic material is present in the membrane in two different forms, which differ in size by more than one order of magnitude.

Figure 13:
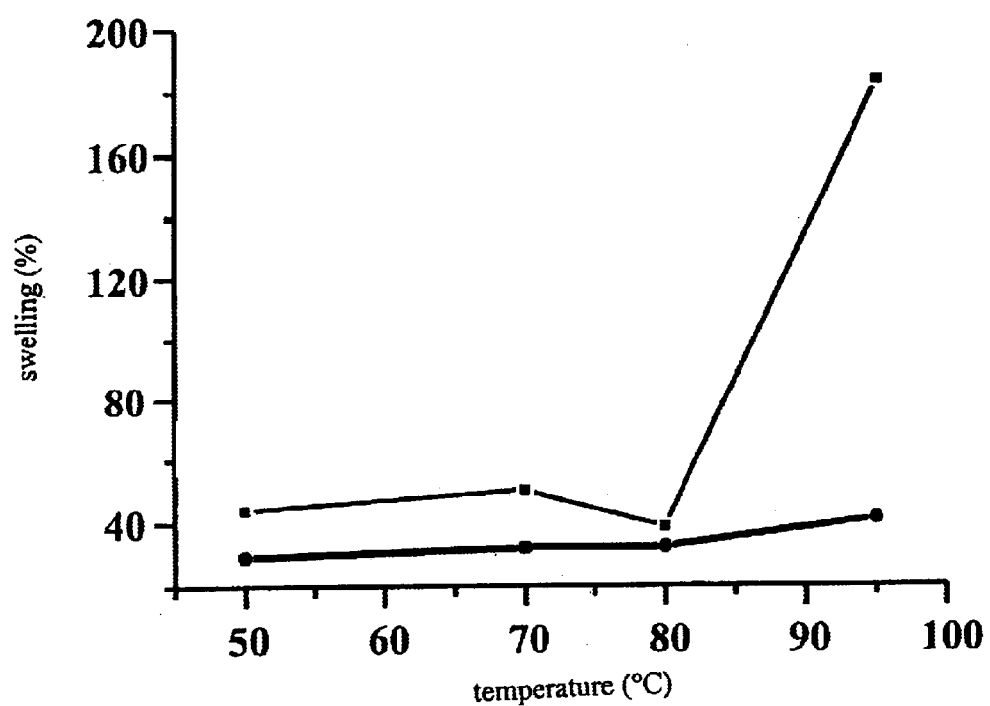
FIG. 13 represents the temperature-dependent swelling behavior of a pure SPEEK membrane in water (■) compared to a composite membrane (•)

Swelling behavior: FIG. 13 shows a diagram representing the swelling behavior of the membranes in water as a function of temperature. A composite membrane is compared to a membrane made of pure SPEEK. A markedly reduced swelling behavior of the composite membrane can be seen, in particular at temperatures higher than 80° C.

Figure 14:
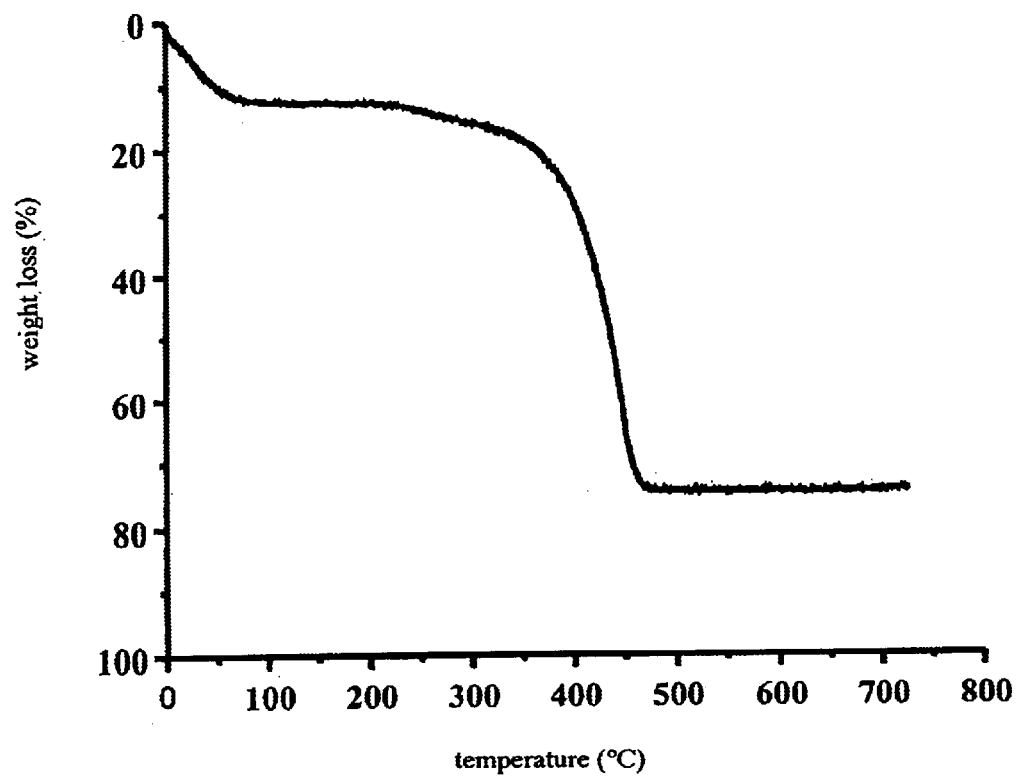
FIG. 14 depicts the thermogravimetric analysis of a composite membrane containing 30 percent by weight of inorganic material in an oxygen atmosphere, recorded at a heating rate of 2 K/min.

Thermal stability (TGA): FIG. 14 shows a diagram of a thermogravimetric analysis of a composite membrane having 30 percent by weight of inorganic material. In the temperature range up to 100° C., the membrane loses approximately 13% of its original mass. The occurring mass loss is attributable to the release of water that is physically bound in the membrane. At temperatures from 230 to 400° C., the 7% mass loss is attributable to the release of water that is chemically bound in the membrane and to the decomposition of the $SO_3H$ groups. Starting at 400° C., the membrane materials are decomposed very heavily. Above 450° C., no more reduction in mass occurs. A pyrolysis residue remains whose mass indicates the inorganic content.

Proton conductivity: FIGS. 15a and 15b show two diagrams representing the proton conductivities of different composite membranes.

In FIG. 15a: the composite membranes contain 30 percent by weight of phosphotungstic acid and PAOS in relation to the SPEEK, the ratio of phosphotungstic acid to PAOS is 48 to 52 parts by weight. When raising the measuring temperature from 25° C. to 120° C., the proton conductivity increases by a factor of 7.

In FIG. 15b: with increasing content of inorganic material, a proton conductivity increased by factor of 6 is observed.

What is claimed is:

1. A method for manufacturing composite membranes, comprising:
    a) providing a branched polyalkoxy siloxane;
    b) providing an organic proton conductor;
    c) mixing the branched polyalkoxy siloxane with the organic proton conductor;
    d) forming a membrane from the composite component mixture.

2. A composite membrane obtainable by the method according to claim 1.

3. The composite membrane as recited in claim 2, wherein the composite membrane is used in a PEM fuel cell.

4. A composite membrane, comprising:
    a plurality of finely dispersed, spherical particles including at least one siliceous reinforcing material; and
    at least one organic proton conductor.

5. The composite membrane as recited in claim 4, wherein the composite membrane is used in a PEM fuel cell.

6. A PEM fuel cell including a composite membrane, comprising:
    a plurality of finely dispersed spherical particles including at least one a siliceous reinforcing material; and
    at least one organic proton conductor.

* * * * *